United States Patent Office 3,088,917
Patented May 7, 1963

3,088,917
MIXTURES OF SECONDARY AND TERTIARY
PHOSPHITE ESTERS OF ETHER ALCOHOLS
Lester Friedman, Whitestone, N.Y., and Henry Gould, West Orange, N.J., assignors to Weston Chemical Corporation, Newark, N.J., a corporation of New Jersey
No Drawing. Filed Jan. 11, 1961, Ser. No. 97,120
4 Claims. (Cl. 252—182)

The present invention relates to the preparation of secondary phosphites.

It is an object of the present invention to prepare a novel secondary phosphites.

Another object is to prepare secondary phosphites having superior physical properties and particularly having outstanding purity.

A further object is to prepare novel phosphite mixtures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that novel secondary phosphites having the formula

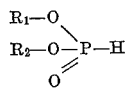

can be prepared. In the formula $R_1$ is alkoxyethoxyethyl, aryloxyethoxyethyl, alkoxypolyethoxyethyl or aryloxypolyethoxyethyl while $R_2$ is the same as $R_1$ or alkyl, aryl, haloalkyl or haloaryl. Preferably both $R_1$ and $R_2$ are $R'O(CH_2CH_2O)_xCH_2CH_2$ where $R'$ is lower alkyl and $x$ is an integer of at least 1. Most preferably $x$ is at least 4.

The novel compounds of the present invention and particularly the preferred class of compounds set forth above are effective scavengers of aldehydes and ketones and to a lesser degree peroxides and hydroperoxides. They can be used as scavengers, for example in purifying alcohols such as methanol, octanol, phenols such as phenol, 2,6-diethylphenol, esters such as dimethyl terephthalate and dimethyl isophthalate, ethers, e.g. diethyl ether etc.

The scavenger action is considerably enhanced by incorporating with the secondary phosphites a special class of tertiary phosphites having the formula

where $R_3$ is alkoxyethoxyethyl, aryloxyethoxyethyl, alkoxypolyethoxyethyl or aryloxypolyethoxyethyl, while $R_4$ and $R_5$ are the same as $R_3$ or alkyl or aryl, or haloalkyl, or haloaryl. Preferably $R_3$, $R_4$ and $R_5$ are all $R'O(CH_2CH_2O)_xCH_2CH_2$ where $R'$ is lower alkyl and $x$ is an integer of at least 1. Most preferably $x$ is at least 4. The tertiary phosphites are high boiling liquids which are prepared as disclosed in copending application 56,129, filed September 15, 1960, now Patent No. 3,047,608.

Generally from 5 to 95% of the secondary phosphite are employed with 95 to 5% by weight of the tertiary phosphite. A more customary range is 30 to 70% of secondary phosphite and 70 to 30% of tertiary phosphite. The mixture of secondary and tertiary phosphites is useful as scavengers of acids, e.g., carboxylic acid, quinones, peroxides, hydroperoxides, oxides, aldehydes and ketones.

The tertiary phosphites also aid in the removal of heavy metals such as copper, nickel, lead and mercury. Thus such contaminants can be removed from various materials such as methanol, octanol, decanol, dimethyl terephthalate, dimethyl isophthalate, phenols, such as 2,6-diethylphenol, phenol, etc.

The desired products can be freed of the impurities simply by distillation from sufficient phosphite ester (or mixture of esters) necessary to react with the impurities. Preferably, an excess of the phosphite ester is employed, a 300% excess being frequently recommended. Since the secondary and tertiary phosphite esters are relatively nonvolatile they remain behind in the distillation pot and do not contaminate the desired methanol, dimethyl terephthalate, phenol or the like.

A preferred procedure for forming the new secondary phosphites is by transesterifying the mono alkyl or mono aryl ether of a polyethylene glycol with a secondary alkyl or secondary aryl phosphite. In general, a product of superior purity is obtained by the preferred procedure. If two mols of the ether alcohols are employed per mol of secondary phosphite there is obtained a di(alkoxyethoxyethyl) phosphite (or the corresponding di(alkoxypolyethoxyethyl) phosphite, etc. To insure complete transesterification a slight excess, e.g., 2–10%, of the ether alcohol is employed. However, if only one mol of the ether is used there is obtained a mixed secondary phosphite, e.g., alkoxyethoxyethyl alkyl phosphite or alkoxypolyethoxyethyl aryl phosphite. There is no necessity for adding a catalyst and the desired product can be recovered simply by removing the alkanol or phenol formed by distillation, preferably at reduced pressure, e.g., 10–20 mm. By measuring the amount of alkanol or phenol removed by distillation the extent of completion of the transesterification reaction can be measured. The mixture is usually heated, e.g., to 100–145° C. before beginning the distillation, but such preheating is not essential.

As starting ether alcohols there can be used methoxyethoxyethanol, butoxyethoxyethanol, ethoxyethoxyethanol methoxyethoxyethoxyethanol, mono methyl ether of polyethylene glycol of average molecular weight about 350 (methoxy Carbowax 350), mono methyl ether of polyethylene glycol of average molecular weight about 550 (methoxy Carbowax 550), mono methyl ether of polyethylene glycol of average molecular weight about 750 (methoxy Carbowax 750), methoxy ether of polyethylene glycol of molecular weight 4000 (methoxy Carbowax 4000), methoxyethoxyethoxyethoxyethanol, mono butyl ether of polyethylene glycol of average molecular weight about 750.

As the transesterifying secondary phosphite there can be used diphenyl phosphite, didecyl phosphite, phenyl decyl phosphite, di(2-methylphenyl) phosphite, di(3-methylphenyl) phosphite, di(4-methylphenyl) phosphite, di(2,4 - dimethylphenyl) phosphite, di(2 - chlorophenyl) phosphite, di(4-bromophenyl) phosphite, di(2-fluorophenyl) phosphite, dimethyl phosphite, dibutyl phosphite, dihexyl phosphite, dicyclohexyl phosphite, dioctyl phosphite, di octadecyl phosphite, dilauryl phosphite, di 2-chloroethyl phosphite, di(o-t-butylphenyl) phosphite, di (2-t-butyl-4-methyl phenyl) phosphite, di(2-ethylphenyl) phosphite.

The novel secondary phosphite products of the present invention which can be prepared in the manner taught above and in the specific examples include methoxypolyethoxyethyl phenyl phosphite (where the methoxy polyethoxyethyl group averages about 350 in molecular weight), methoxypolyethoxyethyl decyl phosphite( where the methoxy polyethoxyethyl group averages about 750 in molecular weight), methoxyethoxyethoxyethyl phenyl phosphite, butoxyethoxyethoxyethyl phenyl phosphite, ethoxyethoxyethoxyethyl octodecyl phosphite, methoxyethoxyethyl decyl phosphite, methoxyethoxyethyl octadecyl phosphite, butoxyethoxyethoxyethyl octyl phosphite, di(methoxyethoxyethyl) phosphite, di(ethoxyethoxyethyl) phosphite di(butoxyethoxyethyl) phosphite, di(methoxyethoxyethoxyethoxyethyl) phosphite, di(methoxyethoxyethoxyethyl), phosphite, di(ethoxyethoxyethoxyethyl) phosphite, di(butoxyethoxyethoxyethyl) phosphite, di(methoxypolyethoxyethyl) phosphite (where the methoxy polyethoxyethyl group has an average molecular weight of 350), di(methoxypolyethoxyethyl) phosphite (where the methoxy polyethoxyethyl group has a molecular weight of 550), di(methoxypolyethoxyethyl) phosphite (where the methoxy polyethoxyethyl group has a molecular weight of 750), di(butoxypolyethoxyethyl) phosphite (where the butoxy polyethoxyethyl group has a molecular weight of 590), di(ethoxypolyethoxyethyl) phosphite (where the ethoxy polyethoxyethyl group has a molecular weight of 765), di(phenoxyethoxyethyl) phosphite, di(p-cresyloxyethoxyethyl) phosphite, di(phenoxypolyethoxyethyl) phosphite (where the phenoxy polyethoxyethyl group has a molecular weight of 410), di(phenoxyethoxyethoxyethyl) phosphite and di(methoxypolyethoxyethyl) phosphite (where the methoxy polyethoxyethyl group has a molecular weight of 4000).

The novel secondary phosphites are liquids which are in general soluble in water and common organic solvents.

As examples of tertiary phosphites which can be mixed with the secondary phosphites to form scavenger compositions there are di(methoxypolyethoxyethyl) phenyl phosphite (where the methoxy polyethoxyethyl group averages about 350 in molecular weight), di(butoxypolyethoxyethyl) decyl phosphite (where the butoxy polyethoxyethyl group has a molecular weight of 790), methoxyethoxyethoxyethyl diphenyl phosphite, butoxyethoxyethoxyethyl diphenyl phosphite, di(ethoxyethoxyethyl) phenyl phosphite, di(methoxyethoxyethyl) decyl phosphite, di(methoxyethoxyethyl) octadecyl phosphite, di(methoxyethoxyethoxyethyl) decyl phosphite, di(butoxyethoxyethoxyethyl) octyl phosphite, butoxyethoxyethoxyethyl dioctyl phosphite, butoxyethoxyethoxyethyl dioctyl phosphite, methoxyethoxyethoxyethyl didecyl phosphite, tri(methoxyethoxyethyl) phosphite, tri(ethoxyethoxyethyl) phosphite, tri(butoxyethoxyethyl) phosphite, tri(methoxyethoxyethoxyethoxyethyl) phosphite, tri(methoxyethoxyethoxyethyl) phosphite, tri(ethoxyethoxyethoxyethyl) phosphite, tri(butoxyethoxyethoxyethyl) phosphite, tri(methoxypolyethoxyethyl) phosphite (where the methoxypolyethoxyethyl group has an average molecular weight of about 350), tri(methoxypolyethoxyethyl) phosphite (where the methoxy polyethoxyethyl group has a molecular weight of 550), tri(methoxypolyethoxyethyl) phosphite (where the methoxy polyethoxyethyl group has a molecular weight of 750), tri(butoxypolyethoxyethyl) phosphite (where the butoxy polyethoxyethyl group has a molecular weight of 790), tri(phenoxyethoxyethyl) phosphite, tri(p-cresyloxyethoxyethyl) phosphite, tri(phenoxyethoxyethoxyethyl) phosphite, di(methoxyethoxyethoxyethyl) phosphite, and methoxyethoxyethoxyethyl diphenyl phosphite.

Unless otherwise indicated all parts and percentages are by weight.

Example 1

There were mixed together 702 parts (3 mols) of diphenyl phosphite and 2328 parts (6 mols+a 5% excess) of methoxy Carbowax 350 (methyl ether of polyethylene glycol of average molecular weight about 350). This mixture was heated at 110–120° C. for 30 minutes and the phenol was removed by distillation at 15 mm. pressure. There was obtained as the distillation residue di(methoxypolyethoxyethyl) phosphite (where the methoxypolyethoxyethyl group had an average molecular weight of 350) (di(methoxy Carbowax) phosphite). The product was a yellow liquid having an $n_d^{25°}$ 1.4610 and a specific gravity of 1.135 at 25° C.

Example 2

Example 1 was repeated replacing the methoxy Carbowax 350 by an equal molar amount of methoxy Carbowax 550. The product recovered as the distillation residue was di(methoxy Carboxy 550) phosphite, a viscous yellow liquid.

Example 3

Example 1 was repeated replacing the methoxy Carbowax 350 by an equal molar amount of methoxy Carbowax 750. The product recovered as the distillation residue was di(methoxy Carbowax 750) phosphite, a viscous yellow liquid.

Example 4

Example 1 was repeated but there was employed only 3 mols of the methoxy Carbowax 350. There was recovered liquid phenyl methoxy Carbowax 350 phosphite as the distillation residue.

Example 5

Example 1 was repeated but there were employed 3 mols of didecyl phosphite and 3 mols of methoxy Carbowax 750 as the reactants. The liquid distillation residue obtained was decyl methoxy Carbowax 750 phosphite.

Example 6

Example 1 was repeated replacing the methoxy Carbowax 350 by an equimolar amount of butoxyethoxyethoxyethanol. The product obtained as the distillation residue was di(butoxyethoxyethoxyethyl) phosphite.

As previously set forth, the materials of the above examples are useful as scavengers of aldehydes, ketones, etc. Improved scavenger compositions are shown in the following examples.

Example 7

A mixture of 1 part of di(methoxy Carbowax 350) phosphite and 1 part of tri(methoxy Carbowax 350) phosphite was prepared. It was an effective mixture as a scavenger of aldehydes, ketones, peroxides, ethers, quinones and acids present as impurities in a test sample of dimethyl terephthalate.

In place of equal parts of the two phosphites there can be used for Example 1 part of di(methoxy Carbowax 350) phosphite and 19 parts of tri(methoxy Carbowax 350) phosphite. Also there can be used 19 parts of di(methoxy Carbowax 350) phosphite with 1 part of tri(methoxy Carbowax 350) phosphite.

Also there can be used a mixture of 1 part of di(methoxy Carbowax 750) phosphite with 1 part of tri(methoxy Carbowax 350) phosphite.

What is claimed is:

1. A mixture of a secondary phosphite having the formula

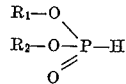

where $R_1$ is a member of the group consisting of phenoxyethoxyethyl, methylphenoxyethoxyethyl, lower alkoxyethoxyethyl, phenoxypolyethoxyethyl, and lower alkoxypolyethoxyethyl, and $R_2$ is selected from the group consisting of $R_1$, alkyl having 1 to 18 carbon atoms, phenyl, lower alkylphenyl, chlorophenyl, bromophenyl and fluorophenyl with a tertiary phosphite having the formula

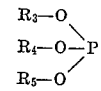

wherein $R_3$ is a member of the group consisting of phenoxyethoxyethyl, methylphenoxyethoxyethyl, lower alkoxyethoxyethyl, phenoxypolyethoxyethyl, and lower alkoxypolyethoxyethyl, and $R_4$ and $R_5$ are selected from the group consisting of $R_3$, alkyl having 1 to 18 carbon atoms, phenyl, lower alkylphenyl, chlorophenyl, bromophenyl and fluorophenyl, 5 to 95% of the mixture being the secondary phosphite and 95 to 5% being the tertiary phosphite.

2. A mixture according to claim 1 wherein $R_1$, $R_2$, $R_3$, $R_4$ and $R_5$ are all lower alkoxypolyethoxyethyl.

3. A mixture according to claim 2 wherein $R_1$, $R_2$, and $R_3$, $R_4$ and $R_5$ are all methoxypolyethoxyethyl groups having an average molecular weight of about 350 to about 750.

4. A mixture according to claim 3 wherein from 30 to 70% of the mixture is the secondary phosphite and 70 to 30% is the tertiary phosphite.

References Cited in the file of this patent
UNITED STATES PATENTS

| | | |
|---|---|---|
| 2,241,244 | Conary et al. | May 6, 1941 |
| 2,639,267 | Pfann | May 19, 1953 |
| 2,832,744 | Soule | Apr. 29, 1958 |
| 2,853,508 | Heckenbleikner | Sept. 23, 1958 |
| 2,862,948 | Mangham | Dec. 2, 1958 |